(12) United States Patent
Mirabito et al.

(10) Patent No.: US 11,349,633 B1
(45) Date of Patent: May 31, 2022

(54) USING TIME PROTOCOL MESSAGES FOR PASSIVE TIME SYNCHRONIZATION

(71) Applicant: Arista Networks, Inc., Santa Clara, CA (US)

(72) Inventors: David J. Mirabito, Camperdown (AU); David C. A. Snowdon, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/107,805

(22) Filed: Nov. 30, 2020

(51) Int. Cl.
*H04L 12/863* (2013.01)
*H04L 7/00* (2006.01)

(52) U.S. Cl.
CPC .................................. *H04L 7/0037* (2013.01)

(58) Field of Classification Search
CPC ...... H04J 3/0667; H04J 3/0697; H04J 3/0664; H04J 3/0632; H04J 3/0638; H04N 21/4307; H04N 21/43637; H04N 21/43615; H04N 21/8547; H04L 12/403; H04L 12/407
See application file for complete search history.

(56) References Cited

U.S. PATENT DOCUMENTS 9,979,998 B1 * 5/2018 Pogue ................... H04J 3/0667
2016/0315860 A1 * 10/2016 Nichols ............. H04L 25/03859

* cited by examiner

*Primary Examiner* — Jamal Javaid
(74) *Attorney, Agent, or Firm* — Chamberlain, Hrdlicka, White, Williams & Aughtry

(57) ABSTRACT

Techniques described herein may be used for determining an offset between clocks in a network. Such techniques may include obtaining, by a passive time device, a first timestamp pair corresponding to a first time protocol message; obtaining, by the passive time device, a second timestamp pair corresponding to a second time protocol message; and calculating, by the passive time device, a clock offset between a time protocol master and the passive time device using the first timestamp pair, the second timestamp pair, and a pre-determined time delay constant corresponding to a network tap.

19 Claims, 6 Drawing Sheets

USING TIME PROTOCOL MESSAGES FOR PASSIVE TIME SYNCHRONIZATION

BACKGROUND

Devices within and/or operatively connected to a network often use a time protocol (e.g., Precision Time Protocol (PTP)) for synchronizing time between devices. However, implementing such time protocols may require implementing full protocol requirements, having source code and licenses to do so, having a relatively large burden placed on devices implementing the time protocol, having to implement the time protocol on all devices to be synchronized, etc.

DETAILED DESCRIPTION

Figure 1A:
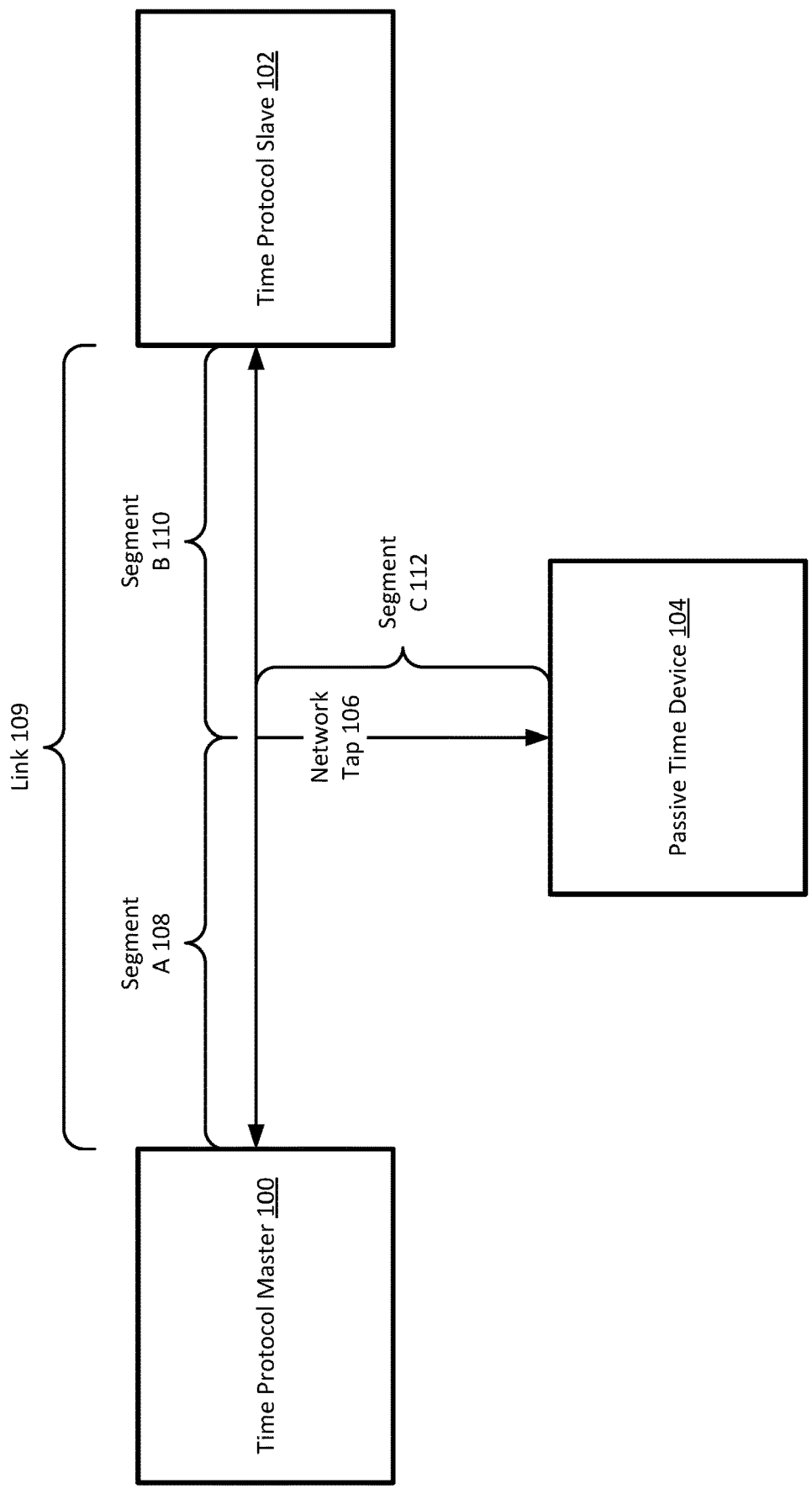
FIG. 1A shows a system for calculating time offsets in accordance with one or more embodiments described herein.

Specific embodiments will now be described with reference to the accompanying figures.

In general, embodiments described herein relate to techniques for determining an offset between the clocks of a time protocol master (e.g., a PTP master device) and a passive time device by tapping a link between the time protocol master and a time protocol slave (e.g., a PTP slave device) to obtain time protocol messages (e.g., sync, follow up, delay request, and/or delay response messages for PTP). In one or more embodiments, timestamps are generated by the passive time device at the time of receipt via the tap for some of the time protocol messages (e.g., when a sync message or delay request message is received). In one or more embodiments, other timestamps are obtained by the passive time device from fields present in the time protocol messages (e.g., transmit time of a sync message, receipt time of a delay request message at a time protocol master). In one or more embodiments, a set of such timestamps are used to calculate the delay from the time protocol master to the passive time device, and the delay from the passive time device to the time protocol master. In one or more embodiments, the delays are used, along with other information, to calculate an offset between the clocks of the time protocol master and the passive time device. Optionally, in one or more embodiments, an action may be taken based on the calculated offset (e.g., a frequency adjustment to synchronize the clock of the passive time device to the time protocol master).

Knowing the offset between two clocks may be advantageous because it allows a user (e.g., network administrator) to accurately be able to know the time at which events in a network occurred, and gives the opportunity to correct any potential offset between the clocks. For example, it may be useful to know that if an event (e.g., a packet is sent) happens at a first device, a subsequent event (e.g., the packet arrives) that occurs at a second device at a second location is timestamped in a manner that allows a user to determine the actual order of events when coupled with the calculated offset.

Existing methods of time synchronization and/or determining clock offset include the use of the PTP protocol. In that protocol, each device seeking to align its clock has to have a relationship with a master device, which requires an exchange of messages with the master device (or with a boundary device that is itself synchronizing with a PTP master). This requires each device to have a PTP implementation, which can be problematic, causes additional network traffic to be sent over the network, has potentially lower quality time precisions, etc.

Embodiments described herein address the above-recited and other problems by having devices (e.g., network devices, time monitor devices, etc.) between a time protocol master (e.g., a PTP master device) and a time protocol slave (e.g., a PTP slave network device) passively tap the connection to intercept and timestamp the time protocol messages to measure the offset between one or more local clocks of the passive time device and a clock of the time protocol master.

For example, in one or more embodiments in which PTP is the relevant time protocol in use, a PTP master device sends a sync message to a PTP slave device. In one or more embodiments, a passive time device between the PTP master device and the PTP slave device receives a copy of the sync message via the tap on a bi-directional link between the PTP master device and the PTP slave device.

In one or more embodiments, such a sync message may be timestamped at the time of receipt by the passive time device. In one or more embodiments, a timestamp of when the sync message was sent from the PTP master device may be obtained by the passive time device from the sync message itself, or from a sync follow-up message. In one or more embodiments, the two timestamps related to the sync message may form a timestamp pair that may be used to calculate the delay from the PTP master device to the passive time device.

In one or more embodiments, a PTP slave device may send a delay request message to the PTP master device. In one or more embodiments, the passive time device receives a copy of the delay request message via the tap on a bi-directional link between the PTP master device and the PTP slave device. In one or more embodiments, such a copy of a delay request message may be timestamped at the time of receipt by the passive time device.

In one or more embodiments, a timestamp of when the delay request message was received by the PTP master device may be obtained by the passive time device from a delay response message sent from the PTP master device to the PTP slave device and copied to the passive time device via the tap on a bi-directional link between the PTP master device and the PTP slave device. In one or more embodiments, the two timestamps related to the delay request message may form a timestamp pair that may be used as part of the offset calculation for the offset between the clocks of the passive time device and the PTP master device.

As an example, the equation for calculating clock offset when PTP is used as the time protocol in a network may be:

$$\text{offset} = O_{MP} = ((T_{R2M} - T_{R2P} - T_{R1P} + T_{T1M})/2) + C$$

where:

$T_{R1P}$=the timestamp of the time at which the first time protocol message (e.g., PTP sync message) is received by the passive time device.

$T_{T1M}$=the timestamp of the time the first time protocol message (e.g., PTP sync message) is transmitted from the time protocol master.

$T_{R2M}$=the timestamp of the time at which the second time protocol message (e.g., PTP delay request message) is received by the time protocol master.

$T_{R2P}$=the timestamp of the time the second time protocol message (e.g., PTP delay request message) is received by the passive time device.

C is time delay for a time protocol message to travel along the tap between the passive time device and the link between the time protocol master and the time protocol slave.

$O_{MP}$=the offset between the clocks of the time protocol master and the passive time device In one or more embodiments, the timestamps related to the sync message and the timestamps related to the delay request message may occur at time intervals larger than desired for offset calculation. For example, every sync message may not receive a delay request message in return. In such scenarios, in one or more embodiments, statistical methods (e.g., time series analysis, linear regression, interpolation, filtering, etc.) may be used to obtain a virtual timestamp pair related to delay request message timing to be used in conjunction with a given timestamp pair related to a sync message to perform the offset calculation. Alternatively, in one or more embodiments, an assumption may be made that the time difference between the sync message and the delay request message is not relevant, thereby accepting any error that such an assumption may introduce in the offset calculation.

In one or more embodiments, due to the fact that there may be asymmetry in the delays from the passive time device and time protocol master, additional steps may be necessary to adjust the calculations to account for that fact. Moreover, in one or more embodiments, the delay between the tap and receipt of delay request and delay response messages by the passive time device is accounted for in the offset calculation. For example, the delay between the tap and the passive time device may be calibrated for by measuring the delay, or by estimating the delay using design and material properties of the tap and the link to the passive time device. In one or more embodiments, the delay may be assumed to be a constant delay in either direction. Other methods of accounting for the delay between the tap and the passive time device may be used without departing from the scope of embodiments described herein.

In one or more embodiments, the offset may be used to understand the times at which events occur in a network, and/or to synchronize the clocks of passive time devices relative to a time protocol master. The clocks of the passive time devices may be synchronized by using the offset to adjust the frequency of one or more clocks of the passive time devices to align the clocks over time, with the offset being recalculated and the adjustment of frequency happening on an on-going basis. Additionally, or alternatively, the offset data may be stored for use when analyzing the time at which events occurred, even where the clock frequencies are not being adjusted. In either scenario, the offset may be repetitively calculated over time. This may allow for continual adjustment of the clock frequencies, and/or the offsets being used to create a database of offsets at given times.

One having ordinary skill in the art will recognize that, although PTP is used herein as an example time protocol, any other time protocol in which messages are exchanged for the purpose of time synchronization may be used with techniques described herein to determine offsets between clocks in a network.

FIG. 1A shows a system in accordance with one or more embodiments described herein. The devices/components shown in FIG. 1A and described below are each only one example of a particular device/component. One having ordinary skill in the art, and the benefit of this Detailed Description, will appreciate that the techniques described herein may apply to any number of different devices. Accordingly, embodiments described herein should not be considered limited to devices shown in FIG. 1A.

As shown in FIG. 1A, the system includes time protocol master (100), time protocol slave (102), and passive time device (104). Each of these components is described below.

In one or more embodiments, time protocol master (100) and time protocol slave (102) are each any device capable of sending and/or receiving time protocol messages, which may be any form of a packet (or other network traffic data such as e.g., Internet Protocol (IP) packets, Media Access Control (MAC) frames, Virtual eXtensible Local Area Network (VXLAN) frames, etc.), such as a computing device (described below). In one or more embodiments, time protocol master (100) and time protocol slave (102) are computing devices. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM) (not shown)), input and output device(s) (not shown), persistent storage, one or more physical interfaces (e.g., network ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described below, a virtual machine executing using underlying hardware components of a physical computing device, and/or any other type of computing device with the aforementioned requirements. As an example, time protocol master (100) may be a PTP server operatively connected to a time source (e.g., a global positioning system (GPS) that provides accurate time to time protocol master (100), and the time protocol slave may be another device (e.g., a network device (described below)) operatively connected to time protocol master (100) and configured to synchronize its clock to time protocol master (100) using the PTP protocol. As another example, both time protocol master (100) and time protocol slave (102) may be network devices implementing the PTP protocol.

In one or more embodiments, as discussed above, one type of a computing device as described herein is a network device. In one or more embodiments, a network device is a physical device that includes and/or is operatively connected to persistent storage (not shown), memory (e.g., random access memory (RAM)) (not shown), one or more processor(s) (e.g., integrated circuits) (not shown), and at least one physical network interface (not shown). Examples of a network device include, but are not limited to, a network switch, a router, a multilayer switch, a fibre channel device, an InfiniBand® device, etc. A network device is not limited to the aforementioned specific examples.

In one or more embodiments, a network device also includes any number of additional components (not shown), such as, for example, network chips, field programmable gate arrays (FPGAs) (not shown), application specific integrated circuits (ASICs) (not shown), indicator lights (not shown), fans (not shown), clocks (not shown) etc.

In one or more embodiments, a network device includes any software configured to perform various functions of the network device. Such software may, for example, execute using one or more processors (including circuitry therein) of a network device, or any other hardware resource of a network device capable of executing software. One example of such software is an operating system (OS) (not shown). In one or more embodiments disclosed herein, an OS includes any software and/or firmware for managing the resources (e.g., hardware, other software, etc.) of one or more network devices.

More specifically, an OS may be a program or set of programs that manages all or any portion of the other software (e.g., applications, agents, etc.) in a network device, as well as all or any portion of the hardware of a network device. Management by an OS may include scheduling, hardware allocation, application execution, network access, management of access to stored files that are selectively made available to applications running on the OS, etc. An OS may also manage and enforce settings and permissions customized for specific applications running within the OS.

In one or more embodiments, a network device includes functionality to send and/or receive packets (or other network traffic data, such as, e.g., frames, etc.) at any of the physical network interfaces (i.e., ports) of the network device and to process the packets. In one or more embodiments, processing a packet includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the packet in order to transmit the packet from an interface of the network device.

In one or more embodiments, the network device is part of a network (not shown). A network (not shown) may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites.

In one or more embodiments, a network may be coupled with or overlap, at least in part, with the Internet. In one or more embodiments, a network includes a collection of one or more network devices (e.g., time protocol master (100), time protocol slave (102)) that may facilitate network connectivity for one or more operatively connected devices (e.g., other computing devices, data storage devices, other network devices, etc.) (not shown). In one or more embodiments, the network devices and other devices within the network are arranged in a network topology (not shown). In one or more embodiments, a network topology is an arrangement of various devices of a network.

In one or more embodiments, the persistent storage (which may be or include non-volatile storage device) and/or memory (which may be or include volatile storage device) of the time protocol master (100) and/or time protocol slave (102) may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of the time protocol master (100) and/or time protocol slave (102) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of the time protocol master (100) and/or time protocol slave (102), cause the one or more processors and/or other hardware components to perform operations in accordance with one or more embodiments described herein.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, time protocol master (100) and/or time protocol slave (102) are operatively connected to and/or include any number of passive time devices (e.g., passive time device (104)). In one or more embodiments, a passive time device (104) is any device that includes, but is not limited to, functionality to: receive packets from any number of passive taps of links between time protocol master (100) and time protocol slave (102); determine which packets are relevant time protocol messages (e.g., PTP messages); accurately timestamp the time of receipt of such time protocol messages; extract timestamps from time protocol messages; store the generated and obtained timestamps; use generated and obtained timestamps to determine an offset from a clock of a time protocol master (100); and/or take one or more actions based on a calculated offset.

In one or more embodiments, passive time device (104) is a computing device (described above), which, as discussed above, may be, in whole or in part, a network device (described above), or a portion therein (e.g., one or more sub-components within a time protocol slave having one or more clocks). However, in one or more embodiments, may not implement some or all of the above-described functionality of a network device. In one or more embodiments, passive time device (104) includes functionality to receive packets from tapped links between time protocol master (100) and time protocol slave (102), to determine which packets are relevant time protocol messages, to generate, if necessary, virtual timestamps for use in performing an offset calculation, to timestamp the time of receipt and/or obtain a timestamp from time protocol messages, and/or to perform clock offset calculations using such timestamps. Passive time devices are discussed in greater detail in the description of FIG. 1B, below.

In one or more embodiments, passive time device (104) includes functionality to receive packets from any number of network taps (e.g., network tap (106)), which are shown in FIG. 1A as the connections between time protocol master (100) and time protocol slave (102) and passive time device (104). In one or more embodiments, network tap (106) is a hardware device (e.g., an optical or electrical device) that is connected on a communication channel (e.g., link (109)) between time protocol master (100) and time protocol slave (102) and includes functionality to copy information (e.g., packets) transmitted therein to be sent to a third party device (e.g., passive time device (104)). In one or more embodiments, such network taps may be referred to as passive taps, which may be taps that do not interfere with the transmission of time protocol messages between time protocol master (100) and time protocol slave (102).

In one or more embodiments, passive time device (104) includes functionality to take an action when one or more offset calculations have completed. In one or more embodiments, one such action is to record (i.e., store) the calculated offset of the clocks of passive time device (104) and time protocol master (100), with or without the timestamps used to make the offset calculation. In one or more embodiments, storing offset values over time creates a time series database of such offsets, which may be used, for example, in virtual timestamp calculations (discussed below). In one or more embodiments, stored offset values may also be used during analyses of network event timing without necessarily having to adjust the clocks of passive time device (104).

Additionally, or alternatively, offset values may be used to synchronize the clocks of passive time device (104) with a clock of time protocol master (100). Such synchronization may be achieved, for example, by adjusting the oscillator frequency of one or more clock devices of passive time device (104) for which the offset was calculated. Such frequency adjustments may occur in response to all or any portion of a series of calculated offsets. In such a scenario, the frequency of the oscillator of the clock device of the passive time device may be increased or decreased to align the clock of the passive time device (104) with that of the time protocol master (100) over time. Such adjustment may be performed in response to each consecutive offset calculation, thereby keeping the clocks synchronized relative to each other. In one or more embodiments, offset values may be used to perform a time change for the clock of one of the devices to a time that is correct, or at least more correct, instead of waiting for a frequency adjustment to cause the clocks to converge.

In one or more embodiments, time protocol master (100) is operatively connected to time protocol slave (102) via a link between the two devices. In one or more embodiments, the link provides an operative connection between time protocol master (100) and time protocol slave (102). In one or more embodiments, the link is connected to time protocol master (100) via a network interface of time protocol master (100). In one or more embodiments, the link is connected to time protocol slave (102) via a network interface of time protocol slave (102).

As shown in FIG. 1, the link (109) between time protocol master (100) and time protocol slave (102) includes segment A (108) and segment B (110). In one or more embodiments, segment A (108) represents a distance between time protocol master (100) and the place in the link where the link is tapped to provide copies of packets to passive time device (104). In one or more embodiments, segment B (110) represents the distance from the tap to time protocol slave (102). Accordingly, segment A (108) and segment B (110) together represent the distance between time protocol master (100) and time protocol slave (102). In one or more embodiments, if passive time device (104) is a sub-component of time protocol slave (102), then a portion of segment A (108) and all of segment B (110) and segment C (112) may be located within time protocol slave (102). Although not shown in FIG. 1A, there may be any number of additional devices and/or components on the link between time protocol master (100) and time protocol slave (102). Additionally, although FIG. 1A shows only a single network tap (i.e., network tap (106)) of the link between time protocol master (100) and time protocol slave (102), there may be any number of taps of the link operatively connected to any number of passive time devices and/or any other device(s). In one or more embodiments, taps of the link (e.g., network tap (106)) are configured to add little or no jitter or additional delay to the propagation of packets, including time protocol messages, between time protocol master (100) and time protocol slave (102). In one or more embodiments, if there is additional delay, or known asymmetry of the segments, then the same may be compensated for during an offset calculation.

As shown in FIG. 1, the distance between the tapped point of the link between time protocol master (100) and time protocol slave (102), and the passive time device, is shown as segment C (112), and is the distance associated with network tap (106). Segment C (112) may be any distance zero or greater. For example, the distance of segment C (112) may be substantially zero if network tap (106) is a passive in-link tap of the link between time protocol master (100) and time protocol slave (102). As another example, segment C (112) may have a distance of greater than zero that corresponds to the length of a transmission medium from the point of tap to passive time device (104). Therefore, in one or more embodiments, the distance of the operative connection between time protocol master (100) and passive time device (104) is the distance of segment A (108) plus the distance of segment C (112). The relevance of the distances between time protocol master (100), the point of tapping, and passive time device (104) are discussed in further detail in the description of FIG. 2A, below.

While FIG. 1A shows a configuration of components, other configurations may be used without departing from the scope of embodiments described herein. For example, there may be any number of passive time devices between a time protocol master and a time protocol slave, each with any number of taps on the link between the time protocol master and the time protocol slave. Accordingly, embodiments disclosed herein should not be limited to the configuration of components shown in FIG. 1A.

Figure 1B:
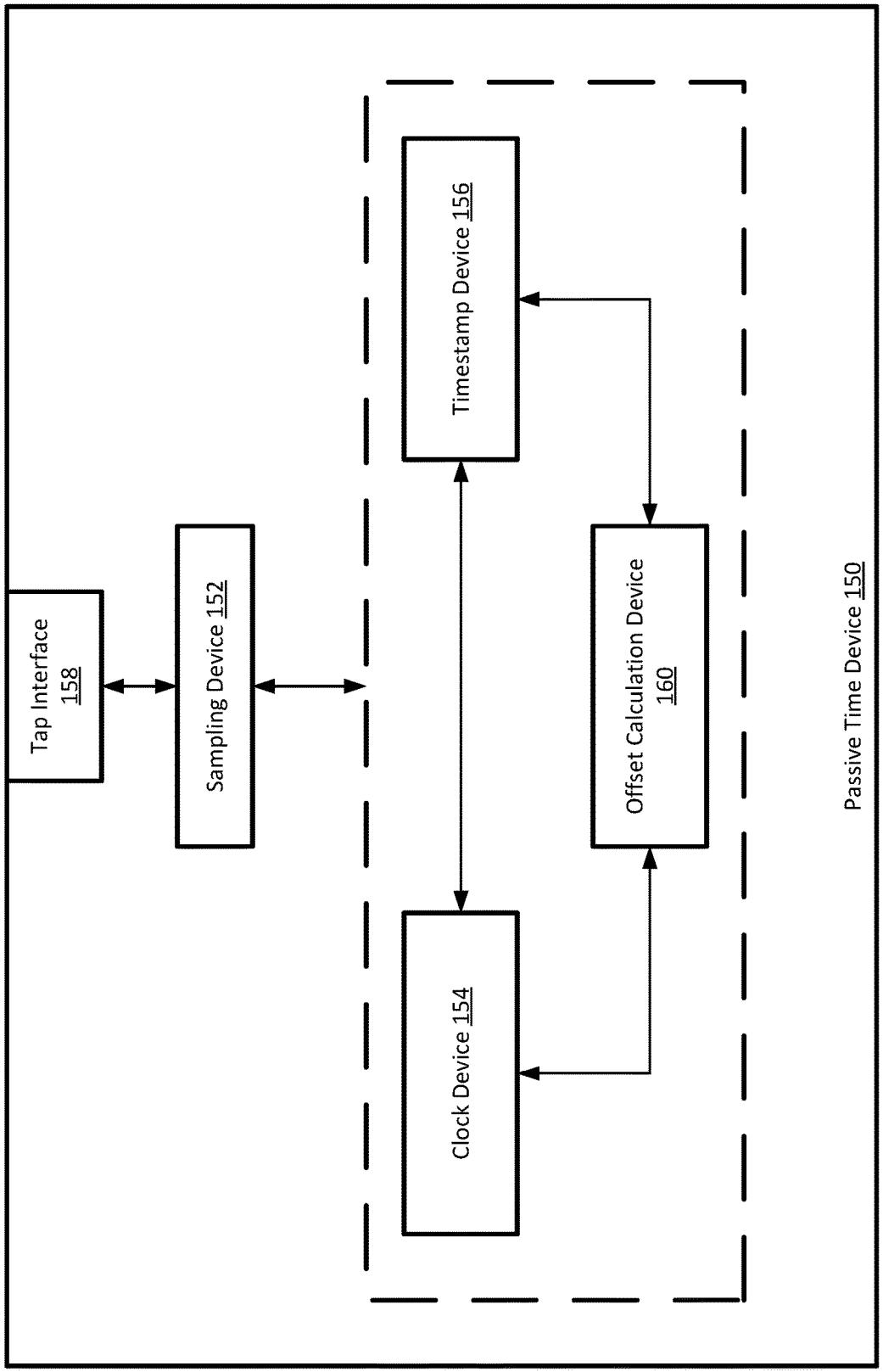
FIG. 1B shows a passive time device that calculates time offsets in accordance with one or more embodiments described herein.

FIG. 1B shows a passive time device (150), which corresponds to passive time device (104) of FIG. 1A, in accordance with one or more embodiments described herein. The devices/components shown in FIG. 1B and described below are each only one example of a particular device/component. One having ordinary skill in the art, and the benefit of this Detailed Description, will appreciate that the techniques described herein may apply to any number of different devices/components. Accordingly, embodiments described herein should not be considered limited to passive time device (150) shown in FIG. 1B.

As shown in FIG. 1B, passive time device (150) includes clock device (154), timestamp device (156), offset calculation device (160), and sampling device (152). Each of these components is described below.

In one or more embodiments, to perform at least a portion of the aforementioned functionality of a passive time device, passive time device (150) includes clock device (154). In one or more embodiments, clock device (154) includes any hardware component or set of hardware components (e.g., including circuitry) that is capable of tracking time at any time scale. For example, such a hardware component may be and/or include an oscillator that oscillates at a specific frequency (e.g., when electricity is applied). In one or more embodiments, the frequency of such oscillations (e.g., clock speed) may be the shortest period of time that a device may use as a clock cycle. Such frequencies may allow for any level of time accuracy, depending on the hardware component. In one or more embodiments, the precision of a given timestamp may be derived using any method of deriving a timestamp based on information, which may or may not be related to the frequency of any oscillator.

For example, frequencies may be possible in the sub-nanosecond range (e.g., down to a femtosecond range). In one or more embodiments, clock device (154) includes additional hardware capable of measuring, at least in part, using the oscillator frequency, the amount of time that has passed from a certain time in the past. For example, time may be divided into epochs, which have a defined starting point, and the number of time units (e.g., nanoseconds) that have passed since the beginning of a given epoch, including possible adjustments (e.g., for leap seconds), may be measured by clock device (154). Although FIG. 1B shows only a single clock device, one having ordinary skill in the art will recognize that passive time device (150) may include any number of clock devices that are each part of one or more components of passive time device (150). In one or more embodiments, such other clock devices may be configured to independently perform operations of clock device (154), and/or may be configured to track offset from and/or synchronize with clock device (154).

In one or more embodiments, passive time device (150) includes timestamp device (156) operatively connected to clock device (154). In one or more embodiments, timestamp device (156) is any hardware (e.g., circuitry), software, firmware, or any combination thereof that includes functionality to record and store timestamps in storage of passive time device (150). In one or more embodiments, timestamp device (156) includes functionality to make a determination, using at least clock device (154), of the current time relative to the beginning of an epoch. In one or more embodiments, timestamp device (156) records such timestamps in storage (not shown) of passive time device (150). Such a timestamp may be associated with the time of receipt of a time protocol message. Such a timestamp may be recorded, for example, by storing a series of binary bits that represent the time value at which a packet was received at passive time device (150). In one or more embodiments, the series of binary bits may include any number of bits, with more bits representing the capability for storing more precise timestamps. For example, a timestamp created by a timestamp device may include enough bits to record the time in a sub-nanosecond range.

In one or more embodiments, timestamp device (156) also includes functionality to obtain timestamps from time protocol messages, and store such timestamps. For example, a PTP sync message from a PTP master device (e.g., time protocol master (100) of FIG. 1A), or, alternatively, a PTP sync follow-up message, may include a field for a timestamp of the time at which the PTP sync message was transmitted from the PTP master device. In one or more embodiments, timestamp device (156) is configured to extract such a time stamp and store it in storage of passive time device (150). As another example, when a PTP slave device sends a delay request message to a PTP master device, timestamp device (156) may include functionality to receive a copy of the delay request message via a network tap (e.g., network tap (106) of FIG. 1A), and timestamp the time at which the delay request is received at passive time device (150). Timestamp device (156) may also then, at a later time, extract a timestamp from a copy of a delay response message sent from the PTP master device to the PTP slave device via a network tap, with such a timestamp representing the time at which the PTP master device received the delay request message from the PTP slave device. In one or more embodiments, timestamp device (156) may include functionality to associate time protocol messages, such as, for example, any or all of PTP sync messages, PTP sync follow-up messages, PTP delay request messages, and/or PTP delay response messages.

In one or more embodiments, passive time device (150) includes any number of communication interfaces (e.g., tap interface (158)) for communicating with other devices via any type of operative connection(s). In one or more embodiments, tap interface (158) is the interface that receives copies of time protocol units (and optionally other packets) via network tap (106) of FIG. 1A for use by other components of passive time device (150).

In one or more embodiments, passive time device (150) includes offset calculation device (160). In one or more embodiments, offset calculation device (160) is any hardware (e.g., circuitry), software, firmware, or any combination thereof that includes functionality to calculate an offset between the time that a given passive time device (e.g., passive time device (150)) has as the time and a time that a time protocol master device has as the time. In one or more embodiments, offset calculation device (160) performs such offset calculations using a set of timestamps generated based on receipt of, or obtained from, time protocol messages.

For example, offset calculation device (160) may use two pairs of timestamps. One pair may include the timestamp of a time at which a time protocol message, such as a PTP sync message, is received by passive time device (150) from a time protocol master, and a timestamp obtained from a time protocol message, such as a PTP sync or sync follow-up message, of the time at which the time protocol message (e.g., PTP sync message) was transmitted from the time protocol master. The second pair may include the timestamp of a time at which a time protocol message, such as a PTP delay request message, is received by passive time device (150) from a time protocol slave, and a timestamp obtained from a time protocol message, such as a PTP delay response message, of a time at which a time protocol message, such as a PTP delay request message, was received by a time protocol master from a time protocol slave.

In one or more embodiments, offset calculation device (160) also includes functionality to generate virtual timestamps (discussed below) as a timestamp pair, to account for any known asymmetry in transmission times (e.g., in the time to and from passive time device relative to the point at which the link between the time protocol master and the time protocol slave is tapped), and/or to account for the delay and/or asymmetry introduced by the tap and/or by the distance between the tap and passive time device (150) (i.e., segment C (112) of FIG. 1A). Details of the use of two timestamp pairs and other information to calculate an offset between passive time device (150) and a time protocol master is discussed in greater detail in the description of FIGS. 2A and 2B, below.

In one or more embodiments, the second pair of timestamps includes the actual timestamps associated with the relevant time protocol message (e.g., a PTP delay request message). Additionally, or alternatively, the second pair may include virtual timestamps that are calculated by offset calculation device (160). In one or more embodiments, if enough time passes between the transmission of a time protocol message, such as a PTP sync message, from a time protocol master to a time protocol slave, and the transmission of responsive time protocol message (e.g., a PTP delay response message in response to a PTP sync message) from a time protocol slave to a time protocol master, the clocks of the time protocol master and passive time device (150) may have drifted further in time from one another. In such a scenario, the possibility of clock drift may be ignored, which may lead to an error in the calculated offset. Alternatively, offset calculation device (160) may perform additional calculations to adjust the timestamp values of the second associated information item pair.

For example, a given passive time device (e.g., 150) may store in any form of data structure (not shown) (e.g., a database, a table, etc.) a history (e.g., a set of time series values) of calculated clock offsets and/or a history (e.g., a set of time series values) of timestamps generated based on receipt of, or obtained from, time protocol messages. In one or more embodiments, such information may be used to calculate virtual timestamps for the second timestamp pair that represent what the timestamps would have been if the two timestamp pairs had been for time protocol messages sent relatively closer in time than actually occurred. Such a calculation may be made, for example, using interpolation, linear regression, etc. One having ordinary skill in the art will recognize that any other form of statistical analysis may be used to calculate the aforementioned virtual timestamps of the second pair used in the offset calculation of offset calculation device (160).

In one or more embodiments, passive time device (150) includes sampling device (152) that is operatively connected to any or all of clock device (154), timestamp device (156), and/or offset calculation device (160). In one or more embodiments, sampling device (152) is any hardware (e.g., circuitry), software, firmware, or any combination thereof that includes functionality to select relevant time protocol messages for use in offset calculation(s) from packets received by passive time device (150). Such selection of relevant time protocol messages may serve as a filtering function for packets copies received via tap interface (158) from network tap (106) of FIG. 1A. For example, sampling device (152) may be configured to select only PTP messages, or a subset thereof (e.g., only PTP sync, sync follow-up, delay request, and/or delay response messages).

While FIG. 1B shows a configuration of components, other configurations may be used without departing from the scope of embodiments described herein. For example, there may be any number of clock devices, timestamp devices, offset calculation devices, and/or sampling devices included in a passive time device. Accordingly, embodiments disclosed herein should not be limited to the configuration of components shown in FIG. 1B.

Figure 2A:
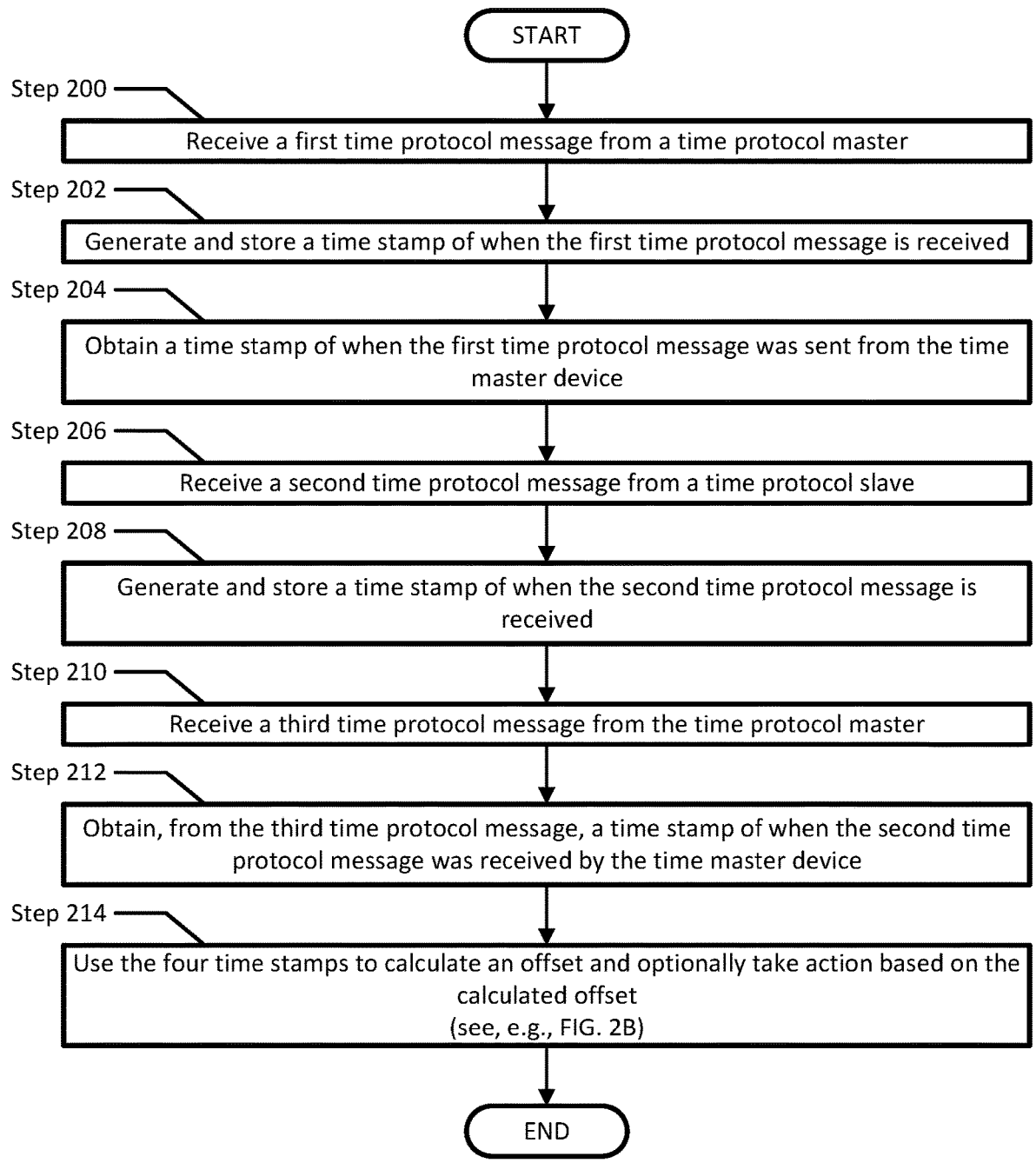
FIG. 2A shows a flowchart for calculating time offset in accordance with one or more embodiments described herein.

FIG. 2A shows a flowchart describing a method for performing offset calculation(s) between passive time devices and time protocol masters using time protocol messages obtained via passive tapping. The method shown in FIG. 2A is only one example of a particular scheme for performing offset calculation(s) between passive time devices and time protocol masters using time protocol messages obtained via passive tapping. Accordingly, embodiments described herein should not be considered limited to the specific scheme shown in FIG. 2A.

For example, while the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, that certain steps may be performed closer or farther from one another in time, and/or that other steps than what is shown in FIG. 2A may be performed in accordance with embodiments described herein.

In Step 200, a copy of a first time protocol message is received from a time protocol master at a passive time device. In one or more embodiments, the first time protocol message was transmitted from the time protocol master towards a time protocol slave, and the time protocol message copy was created via a tap on the link between the time protocol master and the time protocol slave, and sent via the tap to the passive time device.

For example, a time protocol slave (e.g., a PTP slave device) may be configured to synchronize its clock with a time protocol master (e.g., a PTP master device). To achieve the synchronization, in one or more embodiments, the time protocol master periodically transmits a sync message towards the time protocol slave. In one or more embodiments, a copy of such a sync message is generated at the tap on the link, and provided to the passive time device via the tap.

In Step 202, the passive time device generates a first timestamp that indicates the time at which the first time protocol message arrived at the passive time device. In one or more embodiments, the first timestamp is a representation of the time as known by the clock device of the passive time device. In one or more embodiments, the time is a time as measured from the beginning of an epoch, such as an epoch of Unix time, which may, for example, measure the current Coordinated Universal Time (UCT). Other time standards (e.g., International atomic time (TAI)) may be used without departing from the scope of embodiments described herein. In one or more embodiments, the resolution of the timestamp is based on the oscillation frequency of an oscillator of the clock device of the passive time device. As such, the higher the frequency, the greater the resolution of time that can be obtained. As an example, an oscillator with a high enough frequency may be able to measure time in a sub-nanosecond range. In one or more embodiments, as discussed above in the description of FIG. 2, a timestamp may be derived using any method of deriving a timestamp, and may, for example, be derived at a resolution less than the frequency of the oscillator.

In one or more embodiments, the first timestamp is stored in storage of the passive time device. As an example, the timestamp may be a timestamp of the time at which a passive time device receives a copy of a sync message from a PTP master device. In one or more embodiments, the timestamp is a numerical information item that represents a time at any level of time resolution. For example, the timestamp may be a series of binary bits, where the number of bits is sufficient to allow the timestamp to record the time at which the first time protocol message was received by the passive time device at a sub-nanosecond level.

In Step 204, a second timestamp is obtained by the passive time device that represents the time that the first time protocol message (e.g., PTP sync message) was sent from a time protocol master. In one or more embodiments, the second timestamp is obtained from a time protocol message. For example, the second timestamp may exist as a field within a time protocol message. The second timestamp may be obtained from the first time protocol message that was received in Step 200. For example, the second timestamp may be obtained from the PTP sync message sent from the time protocol master. Alternatively, the second timestamp may be obtained from another time protocol message that the passive time device is able to associate with the first time protocol message. For example, the second timestamp may be obtained from a PTP sync follow-up message copy received by the passive time device via the tap, and associated with the sync message using sequence numbers. In one or more embodiments, the first timestamp based on receipt of a copy of the first protocol message (e.g., PTP sync message) by the passive time device, and the second timestamp representing when a time protocol master sent the first time protocol message, are stored and associated as a first timestamp pair relating to the first time protocol message.

In Step 206, a copy of a second time protocol message (e.g., a PTP delay response message) is received at the passive time device. As discussed above in the description of Step 200 and receipt of the copy of the first time protocol message, the second time protocol message is received via a tap on the link between the time protocol master and the time protocol slave, which provides a copy of the second time protocol message to the passive time device. In one or more embodiments, the second time protocol message is a packet being transmitted by the time protocol slave towards the time protocol master via the operative connection between the time protocol slave and the time protocol master is tapped by the passive time device.

For example, a time protocol slave (e.g., a PTP slave device) may be configured to synchronize its clock with a time protocol master (e.g., a PTP master device). To achieve the synchronization, in one or more embodiments, the time protocol master periodically transmits a sync message towards the time protocol slave. The time protocol slave may generate delay response messages, and transmit the delay response messages towards the time protocol master. In one or more embodiments, a copy of such a delay response message is generated at the tap on the link, and provided to the passive time device via the tap.

In Step 208, the passive time device generates a third timestamp that indicates the time at which the second time protocol message (e.g., PTP delay request message) arrived at the passive time device. In one or more embodiments, the third timestamp is a representation of the time as known by the clock device of the passive time device. In one or more embodiments, the time is a time as measured from the beginning of an epoch, such as an epoch of Unix time, which may, for example, measure the current Universal Coordinated Time (UTC). Other time standards (e.g., International atomic time (TAI)) may be used without departing from the scope of embodiments described herein. In one or more embodiments, the resolution of the timestamp is based on the oscillation frequency of an oscillator of the clock device of the passive time device. As such, the higher the frequency, the greater the resolution of time that can be obtained. As an example, an oscillator with a high enough frequency may be able to measure time in a sub-nanosecond range. In one or more embodiments, as discussed above in the description of FIG. 2, a timestamp may be derived using any method of deriving a timestamp, and may, for example, be derived at a resolution less than the frequency of the oscillator.

In one or more embodiments, the third timestamp is stored in storage of the passive time device. As an example, the timestamp may be a timestamp of the time at which a passive time device receives a copy of a delay response message from a PTP slave device. In one or more embodiments, the timestamp is a numerical information item that represents a time at any level of time resolution. For example, the timestamp may be a series of binary bits, where the number of bits is sufficient to allow the timestamp to record the time at which the first time protocol message was received by the passive time device at a sub-nanosecond level.

In Step 210, a copy of a third time protocol message (e.g., PTP delay response message) is received from a time protocol master at a passive time device. In one or more embodiments, the third time protocol message was transmitted from the time protocol master towards a time protocol slave, and the time protocol message copy was created via a tap on the link between the time protocol master and the time protocol slave, and sent via the tap to a passive time device.

For example, a time protocol slave (e.g., a PTP slave device) may be configured to synchronize its clock with a time protocol master (e.g., a PTP master device). To achieve the synchronization, in one or more embodiments, the time protocol master, in response to receiving a PTP delay request message from a time protocol slave, transmits a PTP delay response message towards the time protocol slave. In one or more embodiments, a copy of such a delay response message is generated at the tap on the link, and provided to the passive time device via the tap.

In Step 212, a fourth timestamp is obtained by the passive time device that represents the time that the second time protocol message (e.g., PTP delay request message) was received by a time protocol master from a time protocol slave. In one or more embodiments, the fourth timestamp is obtained from the copy of the third time protocol message received by the passive time device.

For example, the fourth timestamp may exist as a field within the third time protocol message. Such a time protocol message may, for example, be a PTP delay response message sent from a time protocol master towards a time protocol slave that includes a field for a timestamp of the time of receipt, by the time protocol master, of the delay request message (i.e., the second time protocol message) from the time protocol slave. Such a third time protocol message may be received by the passive time device via the tap on the link between the time protocol master and the time protocol slave.

In one or more embodiments, the third timestamp based on a time of receipt of a copy of the second protocol message (e.g., PTP delay request message) by the passive time device, and the fourth timestamp representing when a time protocol master received the second time protocol message from the time protocol slave, are stored in storage of the passive time device and associated as a second timestamp pair relating to the second time protocol message (e.g., PTP delay request message). In one or more embodiments, the manner of storing the second timestamp pair is similar to the storing of the first timestamp pair, which is described above.

In Step 214, the first timestamp and the second timestamp (i.e., the first timestamp pair), and the third timestamp and the fourth timestamp (i.e., the second timestamp pair), are used to calculate a clock offset between the clocks of the time protocol master and the passive time device. Optionally, an action may be taken based on the aforementioned offset calculation. Details of the offset calculation, and actions that may be taken based thereon, are discussed further in the description of FIG. 2B, below.

Figure 2B:
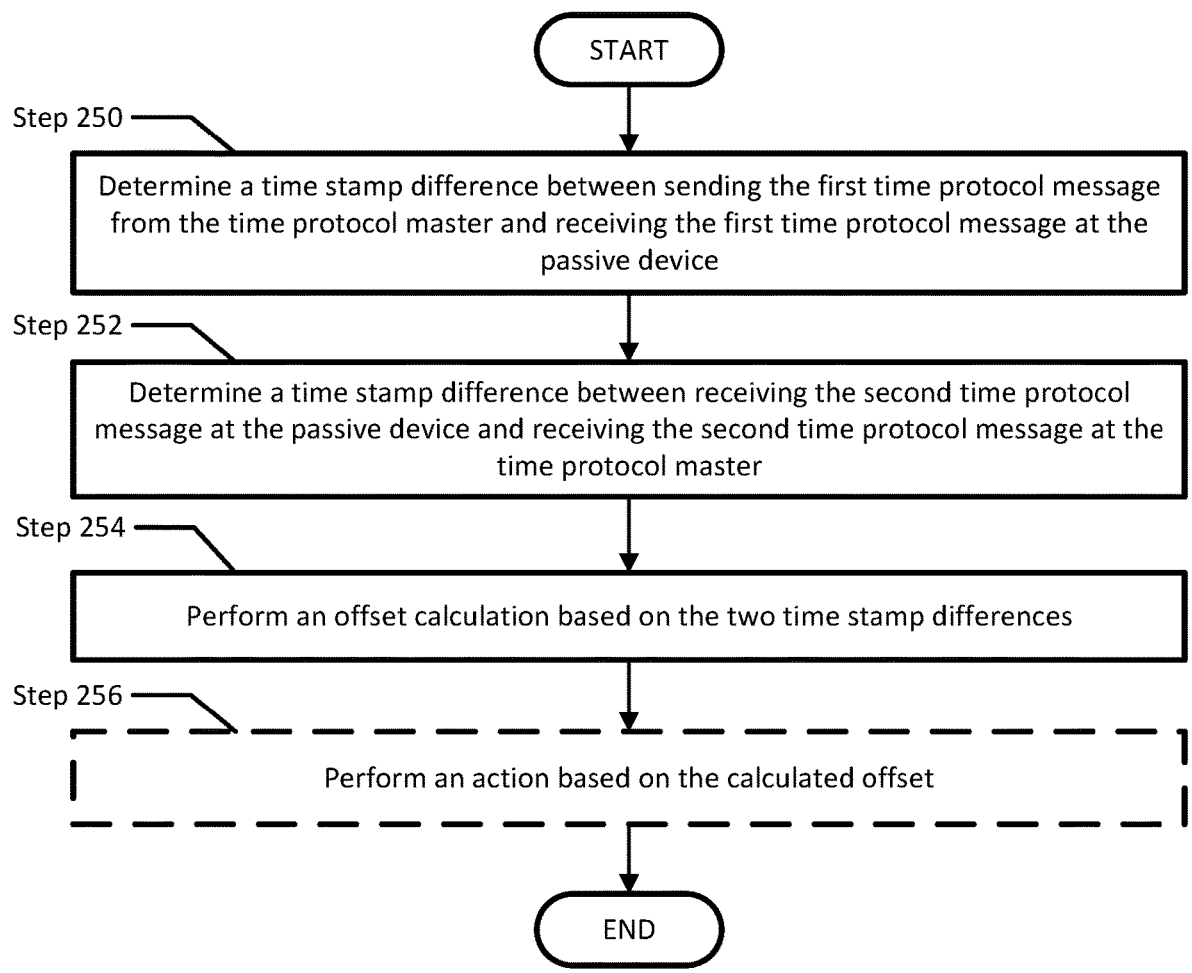
FIG. 2B shows a flowchart for calculating time offset in accordance with one or more embodiments described herein.

FIG. 2B shows a flowchart describing a method for performing an offset calculation. The method for such offset calculation shown in FIG. 2B is only one example of a particular scheme for offset calculation. Accordingly, embodiments described herein should not be considered limited to the offset calculation scheme and use shown in FIG. 2B.

For example, while the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, that certain steps may be performed closer or farther from one another in time, and/or that other steps than what is shown in FIG. 2B may be performed in accordance with embodiments described herein.

In Step 250, the offset calculation includes determining a first timestamp difference from a first timestamp of the time a first time protocol message was received from a time protocol master by a passive time device, and a second timestamp of the time at which the first time protocol message was sent from the time protocol master. In one or more embodiments, the difference is ascertained by subtracting the second timestamp from the first timestamp. In one or more embodiments, the timestamp difference from the time protocol master to the passive time device is the time the first time protocol message took to travel along segment A (108) and segment C (112) as shown in FIG. 1A. In one or more embodiments, the timestamp difference plus any offset between the clock of the time protocol master and the passive time device represents the one-way delay from the time protocol master to the passive time device.

For example, the time protocol being used in a network may be PTP. The first time protocol message may be a sync message sent from the PTP master device (i.e., the time protocol master) to the PTP slave device (i.e., time protocol slave). After traversing a portion of the link between the PTP master and the PTP slave, the sync message reaches a network tap, and is copied and provided to a passive time device. The timestamp of the time the passive time device receives the copy of the sync message is the first timestamp, and the timestamp of the time the PTP master sent the sync message is the second timestamp. The second timestamp may be obtained by the passive time device from the sync message. Alternatively, the second timestamp may be obtained by the passive time device from a sync follow-up message sent by the PTP master after sending the sync message, which may be identified based on a sequence number as being related to the sync message. In one or more embodiments, the result of subtracting the second timestamp from the first timestamp, plus any offset between the respective clocks, is the one-way delay from the PTP master to the passive time device.

In Step 252, the offset calculation includes determining a second timestamp difference from a third timestamp of the time at which a second time protocol message is received by the passive time device from a time protocol slave, and a fourth timestamp of the time at which a time protocol master received the second time protocol message.

In one or more embodiments, the second timestamp difference represents the time taken for the second protocol message to travel a portion of the distance from the tap on the link (i.e., the link between the time protocol master and the time protocol slave) and the time protocol master. In one or more embodiments, this is because once the second time protocol message, sent from the time protocol slave towards the time protocol master, reaches the tap, the copy of the second time protocol has to traverse the length of the tap to reach the passive time device. In one or more embodiments, at the same time the copy of the second time protocol message is traveling along the tap to the passive time device, the second time protocol message is continuing the travel towards the time protocol master. In one or more embodiments, the time that the copy travels along the tap to the passive time device must be accounted for in a calculation of the offset between the clocks of the time protocol master and the passive time device. The time that the copy travels along the tap to the passive time device may be zero or close to zero in the case of an in-line passive tap, or non-zero if there is a distance (e.g., of wire) that the copy must travel along the tap to get to the passive time device. Accounting for the time that the copy travels along the tap to the passive time device during an offset calculation is discussed further in the description of Step 254, below.

In Step 254, an offset calculation is performed using the first timestamp difference found in Step 250, the second timestamp difference found in Step 252, and the time that a time protocol message takes to travel along the tap to or from a passive time device, which may be referred to as C. In one or more embodiments, C is the time delay along the distance of the tap, and may be calibrated for. In one or more embodiments, the calibration may assume that C is constant. C may be ascertained, for example, by examining design and/or material properties of the tap (e.g., length of the tap wire, material of the tap wire, etc.). As another example, C may be ascertained by performing measurements prior to performing the offset calculation.

In one or more embodiments, the offset calculation is performed by subtracting the first timestamp difference from the second timestamp difference, dividing the result by two, and adding C.

An example derivation of the offset equation is as follows:

$$T_{R1P} - T_{T1M} + O_{MP} - C = T_{R2M} - T_{R2P} - O_{MP} + C$$

$$2*O_{MP} = T_{R2M} - T_{R2P} - (T_{R1P} - T_{T1M}) + 2*C$$

$$2*O_{MP} = T_{R2M} - T_{R2P} - T_{R1P} + T_{T1M} + 2*C$$

$$O_{MP} = ((T_{R2M} - T_{R2P} - T_{R1P} + T_{T1M})/2) + C$$

where:

$T_{R1P}$=the timestamp of the time at which the first time protocol message (e.g., PTP sync message) is received by the passive time device $T_{T1M}$=the timestamp of the time the first time protocol message (e.g., PTP sync message) is transmitted from the time protocol master $T_{R1P} - T_{T1M}$=the timestamp difference between the time the first protocol message is received by the passive time device and the time the first protocol message is sent from the time protocol master $T_{R2M}$=the timestamp of the time at which the second time protocol message (e.g., PTP delay request message) is received by the time protocol master $T_{R2P}$=the timestamp of the time the second time protocol message (e.g., PTP delay request message) is received by the passive time device $T_{R2M} - T_{R2P}$=the timestamp difference between the time the second time protocol message is received by the time protocol master and the time the second protocol message is received by the passive time device C is time delay for a time protocol message to travel along the tap between the passive time device and the link between the time protocol master and the time protocol slave $O_{MP}$=the offset between the clocks of the time protocol master and the passive time device In one or more embodiments, once the offset between the clocks of the time protocol master and the passive time device (e.g., $O_{MP}$) is calculated, the offset is stored in storage of the passive time device, and may optionally be associated with the four timestamps used in the offset calculation, which may also be stored in storage of the passive time device.

In one or more embodiments, the above-described offset calculation assumes that the first time protocol message and the second time protocol message were communicated at times relatively close to one another. However, if such an assumption is incorrect, a possibility exists that the clocks of the time protocol master and the passive time device may have drifted relative to one another in the time between the exchange of the time protocol messages for example, there may be a time delay between the time the time protocol slave receives a PTP sync message and the time the time protocol slave device transmits a PTP delay response message in response to the PTP sync message. As another example, not every PTP sync message from a PTP master device may have a corresponding PTP delay request message from a PTP slave device. In such scenarios, certain additional steps may be taken with regard to potential clock drift.

Specifically, in one or more embodiments, if such an assumption is incorrect, at least two additional possibilities exist. First, the time difference may be ignored, and the potential error in calculated clock offset may be accepted. Second, if accepting the error is not desired, additional calculation steps may be performed during the offset calculation. For example, the passive time device may have a time series database of calculated offsets at certain timestamps known to the passive time device. In one or more embodiments, with such a time series database, the passive time device may include functionality to perform a statistical analysis (e.g., interpolation, linear regression, etc.) to determine what the timestamps associated with the second time protocol message should be for use in the offset calculation. Such timestamps may be referred to as virtual timestamps for the second time protocol message, and may be used as described above during the offset calculation by the passive time device.

Additionally, as discussed above, in one or more embodiments, the above-described calculation assumes that the delay time between the time protocol master and the passive time device is symmetric in both directions with respect to the delay time from the tap to the passive time device. In one or more embodiments, if the delay times are actually asymmetric, the additional steps may be necessary (e.g., calibration based on the known asymmetry) before performing the offset calculation.

In Step 256, an action is taken based on the calculated offset. In one or more embodiments, the action taken based on the calculated offset may be to store the offset and any relevant associated timestamp information in storage of the passive time device. Additionally, or alternatively, the action taken may include adjusting the clock of the passive time device. For example, the time protocol master may have a clock tracking a GPS clock, and thus may be considered as an accurate clock. In such a scenario, the passive time device may adjust the frequency of the oscillator of its clock device higher or lower to move the time closer to that of the time protocol master. Performing such adjustments in response to a series of offset calculations may cause the clocks of the passive time device and the time protocol master to remain relatively synchronized. Also additionally or alternatively, the clock of the passive time device may be adjusted to match or at least nearly match that of the time protocol master, rather than waiting for frequency adjustment to cause the clocks to converge with respect to time. As another example, the calculated offset may be provided to another computing device, which may use the offset for any relevant purpose, such as storing a history of calculated offsets from one or more devices.

After Step 256, the process ends for a given offset calculation. However, one of ordinary skill in the art will recognize that such calculations will occur over time as time protocol messages are communicated between the time protocol master and the time protocol slave.

Figure 3:
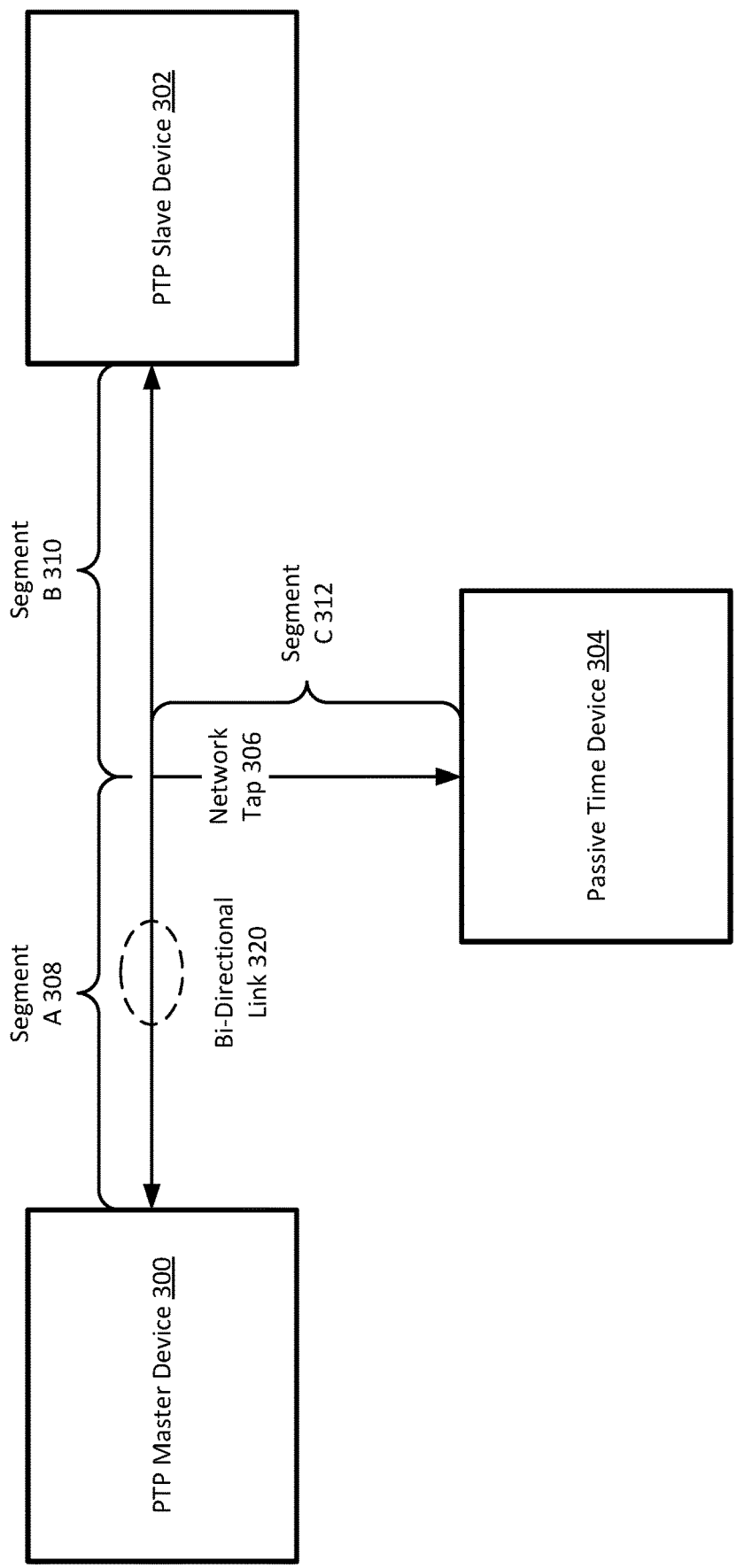
FIG. 3 shows an example of calculating time offset in accordance with one or more embodiments described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. Additionally, for the sake of clarity, timestamps discussed in the below example will be simple one or two digit integers, instead of the many-bit binary numbers that would actually be used, for example, in recording a sub-nanosecond time stamp.

Referring to FIG. 3, consider a scenario in which PTP master device (300) is operatively connected to PTP slave device (302) via bi-directional link (320). Bi-directional link (320) is tapped by network tap (306) to provide copies of packets to passive time device (304). The distance between PTP master device (300) and network tap (306) is represented as segment A (308). The distance from network tap (306) to PTP slave device (302) is represented as segment B (310). Segment A (308) and segment B (310) together form the distance of the operative connection between PTP master device (300) and PTP slave device (302) that a PTP message must traverse to facilitate PTP-related communication between the two devices. Network tap (306) provides an operative connection between bi-directional link (320) and passive time device (304) and provides copies of packets, including PTP messages, that are transmitted using bi-directional link (320) to passive time device (304). Passive time device (304) is configured to filter the packets received via network tap (306) to obtain relevant PTP messages for use in calculating the offset between the clock of PTP master device (300) and passive time device (304), to know the time delay of transmitting PTP messages between itself and bi-directional link (320) via network tap (306), and to, if necessary, use a stored history of PTP message timestamps to produce virtual timestamps related to virtual PTP delay request messages.

In such a scenario, a calculation of an offset between the clock of PTP master device (300) and passive time device (304) may be performed as is described below.

First, PTP master device (300) transmits a PTP sync message towards PTP slave device (302). Network tap (306) copies the PTP sync message and provides it to passive time device (304). Passive time device (304) generates a first timestamp at the time the PTP sync message is received by passive time device (304). Passive time device (304) then examines the PTP sync message or associated follow-up message to obtain a second timestamp indicating the time at which the PTP sync message was transmitted from the PTP master device. The first timestamp and the second timestamp are stored as a first timestamp pair. The first timestamp and the second timestamp relate to the time the PTP sync message took to traverse from PTP master device (300) to passive time device (304) along segment A (308) and the copy of the PTP sync message took to traverse along segment C (312) to passive time device (304).

Next, PTP slave device (302) receives the PTP sync message from PTP master device (300). Some time later, PTP slave device (302) generates a PTP delay request message, and transmits the PTP delay request message towards PTP master device (300). Network tap (306) copies the PTP delay request message and provides it to passive time device (304). Passive time device (304) generates a third timestamp at the time the PTP delay request message is received by passive time device (304).

Next, PTP master device receives the PTP delay request message from PTP slave device (302). In response to receiving the PTP delay request message, PTP master device generates a PTP delay response message that includes a fourth timestamp of when PTP master device (300) received the PTP delay request message, and transmits the PTP delay response message towards PTP slave device (302). At network tap (306) the PTP delay response message is copied and provided via network tap (306) to passive time device (304). Passive time device (304) then examines the PTP delay response message to obtain the fourth timestamp of when PTP master device (300) received the PTP delay request message from PTP slave device (302).

Figure 4:
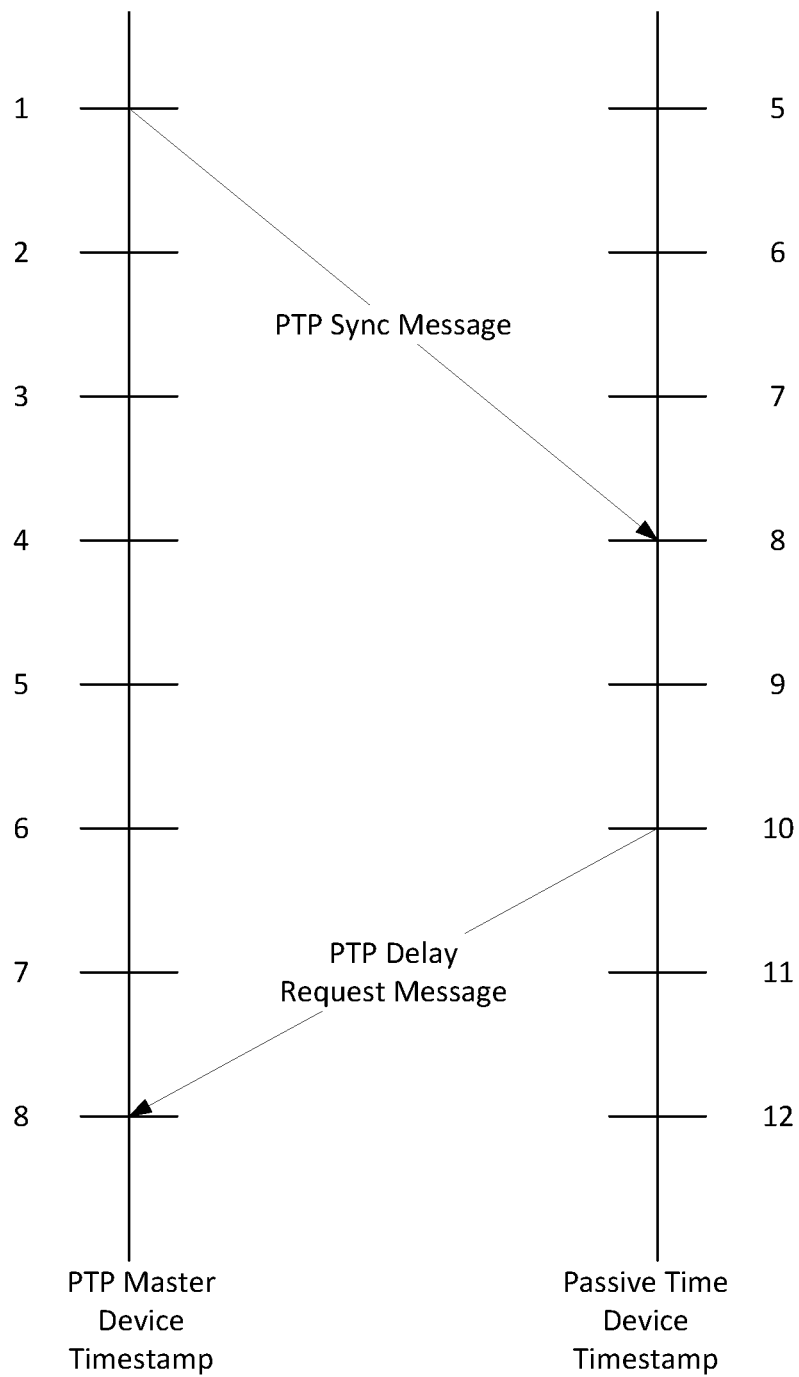
FIG. 4 shows an example of calculating time offset in accordance with one or more embodiments described herein.

A graphic representation of the exchange of the PTP sync message and the PTP delay request message, along with timestamps, may be seen in FIG. 4. The message exchange is described in greater detail below.

As shown in FIG. 4, first, the PTP sync message is transmitted with PTP master device (300) as the source and PTP slave device (302) as the destination. Upon transmission from PTP master device (300), the network tap (306) copies the PTP sync message and provides it to passive time device (304). Passive time device (304) generates a first timestamp of 8 (i.e., the time according to the clock of passive time device (304)) to record the time of receipt of the PTP sync message. Passive time device (304) also examines the PTP sync message or associated follow-up message to obtain a second timestamp of 1, representing the time, according to the clock of PTP master device (300), at which PTP master device (300) transmitted the PTP sync message. The first timestamp and the second timestamp are stored in storage of passive time device (304) and associated with one another for use in an offset calculation.

Next, PTP slave device (302) transmits a PTP delay request message towards PTP master device (300) in response to receipt of the PTP sync message from PTP master device (300). At network tap (306) the PTP delay request message is copied and provided to passive time device (304). Passive time device (304) generates a third timestamp of 10, which is the time, according to the clock of passive time device (304), at which passive time device (304) receives the copy of the delay request message from PTP slave device (302).

Next, PTP master device (300) receives the PTP delay request message from PTP slave device (302). In response to receiving the PTP request message, PTP master device (300) generates a PTP delay response message that includes a fourth timestamp of when PTP master device (300) received the PTP delay request message from PTP slave device (302). At network tap (306), the PTP delay response message is copied and provided to passive time device (304). Passive time device (304) examines the copy of the PTP delay response message and obtains the fourth timestamp of 8, which is the time, according to the clock of PTP master device (300), when PTP master device (300) received the PTP delay request message from PTP slave device (302). The third timestamp and the fourth timestamp are stored in storage of passive time device (304) and associated as related to the PTP delay request message. At this point, passive time device (304) has the first timestamp and the second timestamp as a first timestamp pair, and the third timestamp and the fourth timestamp as a second timestamp pair.

Next, passive time device performs an offset calculation using the four timestamps to determine an offset between its clock and the clock of PTP master device (300). Specifically, passive time device uses the following equation, the two timestamp pairs, and the known constant C of the time delay for transmitting PTP messages along the tap between bi-directional link (320) and passive time device (304), which has been pre-measured to be 2:

Next, passive time device A (304) uses the timestamps of the two pairs of associated information items to solve the following equation for the offset between the clocks of the PTP master device and the passive time device:

$$T_{R1P} - T_{T1M} + O_{MP} - C = T_{R2M} - T_{R2P} - O_{MP} + C$$

which is equivalent to $$O_{MP} = ((T_{R2M} - T_{R2P} - T_{R1P} + T_{T1M})/2) + C$$

where:

$T_{R1P}$=the timestamp of the time at which the first time protocol message (e.g., PTP sync message) is received by the passive time device $T_{T1M}$=the timestamp of the time the first time protocol message (e.g., PTP sync message) is transmitted from the time protocol master $T_{R1P} - T_{T1M}$=the timestamp difference between the time the first protocol message is received by the passive time device and the time the first protocol message is sent from the time protocol master $T_{R2M}$=the timestamp of the time at which the second time protocol message (e.g., PTP delay request message) is received by the time protocol master $T_{R2P}$=the timestamp of the time the second time protocol message (e.g., PTP delay request message) is received by the passive time device $T_{R2M} - T_{R2P}$=the timestamp difference between the time the second time protocol message is received by the time protocol master and the time the second protocol message is received by the passive time device C is time delay for a time protocol message to travel along the tap between the passive time device and the link between the time protocol master and the time protocol slave $O_{MP}$=the offset between the clocks of the time protocol master and the passive time device Thus, the following solves for the offset between the clock of PTP master device (300) and passive time device (304):

$$8 - 1 + O_{MP} - 2 = 8 - 10 - O_{MP} + 2$$

$$2*O_{MP} = ((8-10) - (8-1)) + 4$$

$$2*O_{MP} = (8 - 10 - 8 + 1) + 4$$

$$O_{MP} = ((8 - 10 - 8 + 1)/2) + 2$$

$$O_{MP} = -4.5 + 2$$

$$O_{MP} = -2.5$$

Thus, the offset yields that the clock of passive time device (304) is 2.5 units of time ahead of that of PTP master device (300). Therefore, the frequency of the oscillator of passive time device (304) needs to be modified in order to mitigate the difference in the clock times. In one or more embodiments, mitigating the time difference causes the clocks to become synchronized over time. Alternatively, the offset may be stored without adjusting the clock of passive time device, and a history of such offsets may provide useful information as to the time that events occur in a network.

Although the above example assumes that a given PTP sync message has a PTP delay request message that is close in time to the PTP sync message, the timestamps relating to the delay response message may instead be virtual timestamps obtained using statistical analysis methods to derive what the timestamps would have been related to the timestamps of the sync message using a historical data set of timestamps.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A method for determining an offset between clocks in a network, the method comprising:
   receiving, at a passive time device, a sync message copy of a sync message from a time protocol master via a network tap on a link between the time protocol master and a time protocol slave;
   generating, by the passive time device, a first timestamp corresponding to the receiving of the sync message copy;
   storing, by the passive time device, the first timestamp in storage of the passive time device;
   obtaining, by the passive time device and from the sync message copy, a second timestamp corresponding to a sending of the sync message from the time protocol master;
   storing the second timestamp in the storage of the passive time device;
   associating, by the passive time device, the first timestamp and the second timestamp;
   receiving, at the passive time device, a delay request message copy of a delay request message from the time protocol slave via the network tap on the link between the time protocol master and the time protocol slave, wherein the delay request message is sent from the time protocol slave to the time protocol master;
   generating, by the passive time device, a third timestamp corresponding to the receiving of the delay request message copy;
   storing, by the passive time device, the third timestamp in the storage of the passive time device;
   receiving, at the passive time device, a delay response message copy of a delay response message from the time protocol master via the network tap on the link between the time protocol master and the time protocol slave, wherein the delay response message is sent from the time protocol master in response to the delay request message sent from the time protocol slave;
   obtaining, by the passive time device and from the delay response message copy, a fourth timestamp corresponding to receipt of the delay request message by the time protocol master;
   storing, by the passive time device, the fourth timestamp in the storage of the passive time device;
   associating, by the passive time device, the third timestamp and the fourth timestamp; and
   performing, by the passive time device, an offset calculation using the first timestamp, the second timestamp, the third timestamp, the fourth timestamp, and a predetermined time delay constant corresponding to the network tap to determine a clock offset between the time protocol master and the passive time device.

2. A passive time device, comprising:
   a clock device comprising first circuitry and configured to measure time;
   a timestamp device, comprising second circuitry, operatively connected to the clock device, and configured to:
      generate a first timestamp, using the clock device, corresponding to receipt, via a network tap, of a first time protocol message copy of a first time protocol message sent from a time protocol master;

obtain a second timestamp corresponding to a sending of the first time protocol message from the time protocol master;

generate a third timestamp, using the clock device, corresponding to receipt, via the network tap, of a second time protocol message copy of a second time protocol message sent from a time protocol slave; and obtain a fourth timestamp corresponding to receipt of the second time protocol message at the time protocol master; and an offset calculation device, comprising third circuitry, and configured to:

perform an offset calculation using the first timestamp, the second timestamp, the third timestamp, the fourth timestamp, and a pre-determined time delay constant corresponding to the network tap to determine a clock offset between the time protocol master and the passive time device.

3. The passive time device of claim 2, wherein the second timestamp is obtained from the first time protocol message copy.

4. The passive time device of claim 2, wherein the second timestamp is obtained from a first protocol message follow-up message copy.

5. The passive time device of claim 2, wherein the fourth timestamp is obtained from a third time protocol message copy of a third time protocol message transmitted from the time protocol master towards the time protocol slave.

6. The passive time device of claim 2, wherein the third timestamp and the fourth timestamp are virtual timestamps derived using statistical analysis of historical timestamp data related to prior versions of the second time protocol message.

7. The passive time device of claim 2, wherein the offset calculation device is further configured to perform an action based on the clock offset between the passive time device and the time protocol master.

8. The passive time device of claim 7, wherein the action is to adjust a frequency of the clock device of the passive time device.

9. The passive time device of claim 7, wherein the action is to store the clock offset in a historical clock offset database.

10. The passive time device of claim 2, further comprising a sampling device comprising fourth circuitry and configured to:

filter a plurality of packets received via the network tap to obtain the first time protocol message copy and the second time protocol message copy; and provide the first time protocol message copy and the second time protocol message copy to the offset calculation device.

11. A method for determining an offset between clocks in a network, the method comprising:

obtaining, by a passive time device, a first timestamp pair corresponding to a first time protocol message, wherein obtaining the first timestamp pair comprises:

generating, by the passive time device, a first timestamp of the first timestamp pair, wherein the first timestamp corresponds to receipt, via a network tap, of a first time protocol message copy of the first time protocol message sent from a time protocol master; and obtaining a second timestamp of the first timestamp pair corresponding to time at which the first time protocol message was sent from the time protocol master;

obtaining, by the passive time device, a second timestamp pair corresponding to a second time protocol message; and calculating, by the passive time device, a clock offset between the time protocol master and the passive time device using the first timestamp pair, the second timestamp pair, and a pre-determined time delay constant corresponding to the network tap.

12. The method of claim 11, wherein the second timestamp is obtained from the first time protocol message copy.

13. The method of claim 11, wherein the second timestamp is obtained from a follow-up message copy of a follow-up message corresponding to the first time protocol message.

14. The method of claim 11, wherein obtaining the second timestamp pair comprises:

generating, by the passive time device, a third timestamp of the second timestamp pair, wherein the third timestamp corresponds to receipt, via the network tap, of a second time protocol message copy of the second time protocol message sent from a time protocol slave; and obtaining a fourth timestamp of the second timestamp pair corresponding to a time at which the second time protocol message was received by the time protocol master.

15. The method of claim 14, wherein the fourth timestamp is obtained from a third time protocol message copy of a third time protocol message sent from the time protocol master towards the time protocol slave in response to receipt, by the time protocol master, of the second time protocol message.

16. The method of claim 15, wherein:

the first time protocol message comprises a Precision Time Protocol (PTP) sync message, the second time protocol message comprises a PTP delay request message, and the third time protocol message comprises a PTP delay response message.

17. The method of claim 11, wherein obtaining the second timestamp pair comprises:

generating, by the passive time device, a virtual third timestamp of the second timestamp pair using a first statistical analysis of historical timestamp data; and generating a fourth timestamp of the second timestamp pair a second statistical analysis of the historical timestamp data.

18. The method of claim 11, further comprising:

performing an action based on the clock offset between the passive time device and the time protocol master.

19. The method of claim 18, wherein the action is to adjust a frequency of a clock of the passive time device.

* * * * *